Patented July 12, 1938

2,123,474

UNITED STATES PATENT OFFICE 2,123,474

MULTI-PLY FABRIC

Frank R. Redman, Yardley, Pa.

No Drawing. Application April 1, 1937, Serial No. 134,458. In Great Britain April 15, 1936

13 Claims. (Cl. 154—46)

This invention relates to a multi-ply fabric, and more particularly it relates to a multi-ply fabric for use in articles subjected to repeated laundering.

The principal object of the present invention is to provide a multi-ply fabric for use in articles subjected to repeated laundering, such as collars, cuffs, bosoms, and the like, which may be easily laundered and ironed, and which will remain substantially unaffected in color after the launderings to which the apparel is normally subjected.

A further object of the invention is to provide a multi-ply fabric for use in articles subjected to repeated laundering, the plies of which are adherent due to the association therewith of a thermoplastic blend of synthetic resins, which blend while maintaining adherence at and below the boiling point of water will soften at pressing temperatures so that no difficulties are encountered in ironing and, if the plies have become separated at any points due to some unusual treatment, re-adherence of the plies throughout will be brought about by the heat and pressure of the iron.

Other objects will be apparent from a consideration of the specification and claims.

While the invention is directed generally to a multi-ply fabric for use in apparel where the article is repeatedly laundered, the invention will be described specifically in conjunction with the manufacture of collars since the problems presented in the manufacture thereof are illustrative of all the major problems encountered in the production of articles of this type.

It is general practice in the manufacture of collars to assemble multiple plies of fabric which have previously been cut in desired shape and size. A collar so assembled can be divided into its two major parts, namely, the neck-band and the fold-over top. In general practice, both of these major parts are constructed from three plies of fabrics; a face ply, an interlining, and a back ply, the neck-band and fold-over top being made up separately and subsequently stitched together. While there are other processes of manufacturing collars, this method is the one most universally practiced, and the present invention is intended to conform particularly with equipment used to manufacture collars of such general construction, although it is to be understood that other types, including a two-ply collar, may be constructed in accordance with the invention.

In my Patent No. 2,009,139, issued July 23, 1935, I have disclosed and claimed an "Article of apparel such as collars, and method of making same", in which at least one of the fabric plies thereof has its threads set and bonded together by an adherent substance, such as starch or preferably a water-insoluble material, to render the fabric substantially non-shrinking and non-stretching, the plies of the multi-ply fabric being bonded together by a thermoplastic resinous material applied to said pre-set fabric, of such characteristics that it will be substantially unaffected by repeated laundering and will be cementitiously softened at pressing temperatures while retaining its adhesion at and below the boiling point of water. In my Patent No. 2,045,963, which is a division of my aforesaid patent, I have described and claimed a multi-ply fabric using a particular blend of resins possessing especially desirable properties.

The present invention is directed to a multi-ply fabric for use in the manufacture of articles of apparel subjected to repeated laundering which is bonded together by the association with at least one of the plies of the fabric of a thermoplastic blend of resins which is capable of softening at pressing temperatures, retaining adhesion at and below the boiling point of water, and remaining substantially unaffected in color when subjected to repeated laundering.

The practices described and claimed in my Patent No. 2,009,139 may advantageously be employed in the production of the multi-ply fabric of the present invention, in which event, the blend of resins described herein is employed as the thermoplastic resinous material which is applied to the fabric ply which has been treated to render it substantially non-shrinking and non-stretching. Since, however, the blend may be applied directly to an untreated ply, if deemed desirable, the invention will be thus described.

The blend used in the production of the multi-ply fabric of the invention is a mixture of polymerized alkyl alkacrylate and at least one resin selected from the group consisting of a polymerized alkyl acrylate and a polyvinyl resin. The term "alkyl alkacrylate" designates such compounds as methyl methacrylate, ethyl methacrylate, ethyl ethacrylate and the like. The term "alkyl acrylate" includes such compounds as the alkyl esters of acrylic acid, for example, methyl, ethyl, propyl and butyl acrylate and the term "polyvinyl resin" includes the resins so designated by the trade, such as the polymerized vinyl esters of the lower aliphatic acids, for example, vinyl acetate (known as "Vinylite A") vinyl propionate, vinyl butyrate, etc.; the copolymer of vinyl chloride and vinyl esters of the lower aliphatic acids, such as vinyl acetate (this copolymer being known as "Vinylite H"); and vinyl benzene or polymerized phenylethylene which may be considered to belong to the same family as the "Vinylites" except that phenol is substituted for chloride or acetate. Preferably, the invention contemplates the blending of methyl methacrylate with one or more of the resins selected from the group consisting of methyl acrylate, polymerized vinyl acetate, a copolymer of vinyl chloride and vinyl acetate, and vinyl benzene.

Each of the individual resins of the classes or groups mentioned lacks at least one of the desired properties, and the multi-ply fabric of the properties described can, therefore, be obtained only through the use of a blend of two or more of the resins. In any particular instance, the components of the blend and the proportions of the resin constituents therein will be selected and determined by the particular properties of the resins blended in order that the blend shall be thermoplastic and capable of cementitiously softening at the pressing temperature, retaining its adhesion at and below the boiling point of water, and remaining substantially unaffected in color after repeated laundering.

In the following table, certain of the resins of the classes or groups mentioned are listed, together with their softening ranges and laundering qualifications since the range at which the resin will become cementitiously softened and the extent to which they are detrimentally affected with respect to color when exposed to heat, acid, and alkali in laundering are of primary importance:

| Resin | Softening temperature | Laundering qualifications |
| --- | --- | --- |
| "Vinylite A" | 145° F.–155° F | Acid or alkali destroy adhesive properties. |
| "Vinylite H" | 245° F.–255° F | Discolored by heat. |
| Vinyl-benzene | 300° F.–310° F | Satisfactory, but does not have good adhesive qualities. |
| Methyl acrylate | 115° F.–125° F | Does not discolor, but becomes too soft. |
| Methyl methacrylate | 255° F.–265° F | Too hard and brittle. |

It is apparent from the list of resins and their properties that the desirable qualities are not all embodied in any one of the resins, and while it might appear possible to reduce the softening range of the listed resins with the higher softening ranges by the use of a plasticizer, this is not desirable since the plasticizer tends to be washed out during laundering. It should be borne in mind that it is highly desirable to impart to the article a permanent firmness, whereas stiffness, or rather brittleness, is detrimental to wearing quality. Hence, it is one object of this invention to produce an article which is permanently firm and flexible. Hence, the formulae to be listed hereinafter comprise only the resin content alone, it being understood, however, that plasticizer, pigment, solvent, etc., may be used in conjunction with them as desired. Furthermore, if plasticizer is relied upon for the initial bond, the desirable re-bonding cannot take place after the plasticizer is removed by washing. In accordance with the present invention, the desirable properties are obtained by suitably blending the resins. However, in blending the resins, there is not a direct mathematical relationship between the qualities of the component materials and the blended product. Thus, while the softening temperature of "Vinylite H" is approximately 250° F. and that of methyl methacrylate is 260° F., a blend of the two resins in equal proportions has a softening point slightly over 280° F. or considerably higher than the softening temperature of either of the component parts. Conversely, if 50% vinyl benzene with a softening point of about 300° F. is blended with 50% methyl methacrylate with a softening point of about 260° F., a blended resin with a softening point of about 300° F. is obtained, rather than the mathematically figured softening point of 280° F.

The following blends are given as illustrative examples, but it is to be understood that the percentages given may be varied rather widely from the specific figures set forth, the limitations being determined, as before pointed out, by the properties resulting in the blended mixture:—

*Blend 1*

| | Percent |
| --- | --- |
| Methyl methacrylate | 85 |
| Methyl acrylate | 15 |

The softening range is approximately 225° F. and the blend is not discolored by heat, acid or alkali and does not lose its adhesiveness, but there is a tendency for it to become somewhat harsh and brittle and is, therefore, not as desirable as the other examples.

*Blend 2*

| | Percent |
| --- | --- |
| "Vinylite H" | 55 |
| Methyl methacrylate | 45 |

The softening range is about 280° F., and the product is satisfactory in every respect.

*Blend 3*

| | Percent |
| --- | --- |
| "Vinylite A" | 15 |
| Methyl methacrylate | 85 |

The softening range is about 230° F. to 240° F., and the blend is satisfactory in every respect.

*Blend 4*

| | Percent |
| --- | --- |
| "Vinylite H" | 33⅓ |
| Vinyl benzene | 33⅓ |
| Methyl methacrylate | 33⅓ |

The softening range is about 300° F., and the blend is excellent in every respect.

*Blend 5*

| | Percent |
| --- | --- |
| Vinyl benzene | 50 |
| Methyl methacrylate | 50 |

The softening temperature is about 300° F. and the blend is excellent in every respect.

If desired, the blends may contain other substances, for example, a plasticizer, pigment, and the like, but as before pointed out, the blend of resins is relied upon primarily to impart the desired properties to the multi-ply fabric, since permanency of the desirable properties, including permanent firmness and flexibility, as distinguished from hardness and brittleness, is provided by the blends.

The fabric is coated on one or both sides by any suitable means to obtain a continuous film of the resin on the fabric and the use of a standard type backing machine is recommended. In order to convert the resin into paste form for application to the fabric, the resins are dissolved or dispersed in a suitable vehicle such as an equivalent weight of acetone. If it is desired to reduce the volatility of the solvent, a portion of the acetone may be replaced by toluol. The resinous coating applied serves to stiffen or make more firm the fabric treated, and it is practical to control the degree of stiffness or firmness imparted to the fabric by increasing or decreasing the amount of resin employed. To obtain the most desirable properties for most articles, the amount of resinous material applied is kept within rather close limits, for example, two and one-third ounces of resin (dry basis) per square yard of fabric.

The treated fabric after drying may be placed between cover cloths, or adjacent to a cover cloth, and subjected to heat and pressure comparable to that encountered in ironing, for example, in the neighborhood of 300° F. The temperature used in assembling the multi-ply fabric and in ironing is necessarily limited to a temperature below that at which the fabric tends to scorch. In view of the fact that any temperature that can be safely used on cotton fabrics is not sufficiently high to destroy the thermoplasticity of the resins used, the resinous coating remains in this condition which is most desirable when the lining is to be used in soft or semi-soft collars, and, if through some unusual action the lining cloth becomes separated from the cover cloth at certain points, the plies of the multi-ply fabric are united throughout during the subsequent pressing of the collar. If a collar is desired which is more stiff than that obtained by the simple pressing step of the dried treated lining cloth, the assembled lining cloth, and cover cloth or cloths may be moistened with a solvent for the resin, for example, acetone, and thereafter pressed as described.

Considerable modification is possible in the resins and proportions thereof used in the blend, as well as in the method of manufacturing the multi-ply fabric, without departing from the essential features of the invention.

I claim:

1. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized alkyl alkacrylate and at least one resin selected from the group consisting of:—polymerized alkyl esters of acrylic acid, polymerized vinyl esters of the lower aliphatic acids, a copolymer of vinyl chloride and vinyl esters of the lower aliphatic acids, and vinyl benzene, each of which resins in the blend lacks at least one of the aforesaid properties, but which are blended in the mixture in proper proportions to acquire all of the said properties.

2. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and at least one resin selected from the group consisting of:—polymerized alkyl esters of acrylic acid, polymerized vinyl esters of the lower aliphatic acids, a copolymer of vinyl chloride and a vinyl ester of the lower aliphatic acids, and vinyl benzene, each of which resins in the blend lacks at least one of the aforesaid properties, but which are blended in the mixture in the proper proportions to acquire all of the said properties.

3. A multi-ply fabric for use in articles subjected to repeated laundering of which at least one of its plies has associated therewith, causing adherence of said plies a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and at least one resin selected from the group consisting of:—polymerized methyl acrylate, polymerized vinyl esters of the lower aliphatic acids, a copolymer of vinyl chloride and vinyl esters of the lower aliphatic acids, and, vinyl benzene, each of which resins in the blend lacks at least one of the aforesaid properties, but which are blended in the mixture in proper proportions to acquire all of the said properties.

4. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and polymerized methyl acrylate, each of which resins in the blend lacks at least one of the aforesaid properties, but which are blended in the mixture in proper proportions to acquire all of the said properties.

5. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and a copolymer of vinyl chloride and vinyl esters of the lower aliphatic acids, each of which resins in the blend lacks at least one of the aforesaid properties, but which are blended in the mixture in proper proportions to acquire all of the said properties.

6. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and polymerized vinyl acetate, each of which resins in the blend lacks at least one of the aforesaid properties, but which are blended in the mixture in proper proportions to acquire all of the said properties.

7. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate and vinyl benzene, each of which resins in the blend lacks at least one of the aforesaid properties, but which are blended in the mixture in proper proportions to acquire all of the said properties.

8. A multi-ply fabric for use in articles subjected to repeated laundering of which at least one of its plies has associated therewith, causing adherence of said plies, a thermoplastic blend of synthetic resins capable of softening at pressing temperatures, retaining adhesion at and below the boiling point of water and remaining substantially unaffected in color when subjected to repeated laundering, said blend of synthetic resins comprising a mixture of polymerized methyl methacrylate, a copolymer of vinyl chloride and vinyl esters of the lower aliphatic acids, and vinyl benzene, each of which resins in the blend lacks at least one of the aforesaid properties, but which are blended in the mixture in proper proportions to acquire all of the said properties.

9. A multi-ply fabric for use in articles subjected to repeated laundering of which at least one of its plies has associated therewith, causing adherence of said plies, a thermoplastic blend of resins capable of softening at pressing temperatures, retaining adhesion at and below the boiling point of water and remaining substantially unaffected in color when subjected to repeated laundering, said blend of resins comprising a mixture of polymerized methyl acrylate approximately 15% and polymerized methyl methacrylate approximately 85%, each of which resins in the blend lacks at least one of the aforesaid properties, but which are blended in the mixture in said approximate proportions to acquire all of the said properties.

10. A multi-ply fabric for use in articles subjected to repeated laundering of which at least one of its plies has associated therewith, causing adherence of said plies, a thermoplastic blend of resins capable of softening at pressing temperatures, retaining adhesion at and below the boiling point of water and remaining substantially unaffected in color when subjected to repeated laundering, said blend of resins comprising a mixture of polymerized methyl methacrylate approximately 45%, and a copolymer of vinyl chloride and vinyl acetate approximately 55%, each of which resins in the blend lacks at least one of the aforesaid properties, but which are blended in the mixture in said approximate proportions to acquire all of the said properties.

11. A multi-ply fabric for use in articles subjected to repeated laundering of which at least one of its plies has associated therewith, causing adherence of said plies, a thermoplastic blend of resins capable of softening at pressing temperatures, retaining adhesion at and below the boiling point of water and remaining substantially unaffected in color when subjected to repeated laundering, said blend of resins comprising a mixture of polymerized methyl methacrylate approximately 85% and polymerized vinyl acetate approximately 15%, each of which resins in the blend lacks at least one of the aforesaid properties, but which are blended in the mixture in said approximate proportions to acquire all of the said properties.

12. A multi-ply fabric for use in articles subjected to repeated laundering of which at least one of its plies has associated therewith, causing adherence of said plies, a thermoplastic blend of resins capable of softening at pressing temperatures, retaining adhesion at and below the boiling point of water and remaining substantially unaffected in color when subjected to repeated laundering, said blend of resins comprising a mixture of polymerized methyl methacrylate approximately 33%, vinyl benzine approximately 33%, and a copolymer of vinyl chloride and vinyl acetate approximately 33%, each of which resins in the blend lacks at least one of the aforesaid properties, but which are blended in the mixture in said approximate proportions to acquire all of the said properties.

13. A multi-ply fabric for use in articles subjected to repeated laundering of which at least one of its plies has associated therewith, causing adherence of said plies, a thermoplastic blend of resins capable of softening at pressing temperatures, retaining adhesion at and below the boiling point of water and remaining substantially unaffected in color when subjected to repeated laundering, said blend of resins comprising a mixture of polymerized methyl methacrylate approximately 50% and vinyl benzene approximately 50%, each of which resins in the blend lacks at least one of the aforesaid properties, but which are blended in the mixture in said approximate proportions to acquire all of said properties.

FRANK R. REDMAN.